(12) United States Patent
Schott et al.

(10) Patent No.: US 8,474,270 B2
(45) Date of Patent: Jul. 2, 2013

(54) METHODS AND APPARATUS FOR ASSEMBLING A LOW NOISE EJECTOR MOTIVE NOZZLE

(75) Inventors: Carl Gerard Schott, Simpsonville, SC (US); Kevin W. Kinzie, Moore, SC (US); John Joseph Lynch, Greenville, SC (US); David W. Ball, Easley, SC (US); Gunnar Leif Siden, Greenville, SC (US); Kenneth Neil Whaling, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/396,930

(22) Filed: Feb. 15, 2012

(65) Prior Publication Data

US 2012/0137704 A1    Jun. 7, 2012

Related U.S. Application Data

(62) Division of application No. 11/381,598, filed on May 4, 2006, now Pat. No. 8,136,361.

(51) Int. Cl.
*F02C 6/08* (2006.01)
*F02C 9/00* (2006.01)
*F02C 6/04* (2006.01)

(52) U.S. Cl.
USPC .................................. 60/782; 60/785; 60/795

(58) Field of Classification Search
USPC ............ 60/782, 785, 806, 262, 795; 415/116, 415/144
See application file for complete search history.

(56) References Cited

U.S. PATENT DOCUMENTS

| | | | |
|---|---|---|---|
| 3,694,107 A | | 9/1972 | Stein |
| 3,946,948 A | | 3/1976 | Horlin |
| 3,985,302 A | | 10/1976 | Frochaux |
| 5,440,875 A | | 8/1995 | Torkelson et al. |
| 6,082,635 A | * | 7/2000 | Seiner et al. ............. 239/265.19 |
| 6,199,834 B1 | | 3/2001 | Popov et al. |
| 6,224,042 B1 | | 5/2001 | Popov |
| 6,412,270 B1 | * | 7/2002 | Mortzheim et al. ............ 60/782 |
| 6,416,042 B1 | | 7/2002 | Popov |
| 6,450,484 B1 | | 9/2002 | Popov |
| 7,007,864 B2 | | 3/2006 | Snyder et al. |
| 2006/0027679 A1 | | 2/2006 | Gratteau |

* cited by examiner

*Primary Examiner* — Ehud Gartenberg
*Assistant Examiner* — Gerald Sung
(74) *Attorney, Agent, or Firm* — Armstrong Teasdale LLP

(57) ABSTRACT

A method of assembling an ejector is provided, wherein the method includes providing a motive nozzle tip having a centerline axis and including a nozzle tip edge having at least one protrusion extending through a plane substantially normal to the centerline axis. The method also includes coupling the motive nozzle tip to the ejector.

11 Claims, 5 Drawing Sheets

US 8,474,270 B2

METHODS AND APPARATUS FOR ASSEMBLING A LOW NOISE EJECTOR MOTIVE NOZZLE

CROSS REFERENCE TO RELATED APPLICATIONS

This application is a divisional of U.S. patent application Ser. No. 11/381,598 filed May 4, 2006 now U.S. Pat. No. 8,136,361, which is hereby incorporated by reference in its entirety.

BACKGROUND OF THE INVENTION

This invention relates generally to ejectors, and, more particularly, to an ejector motive nozzle that may be used in pumping, compression, or mixing applications.

At least some known ejectors mix two flow streams, a high-pressure ("motive") stream and a low-pressure ("suction") stream, so as to produce a discharge flow with pressure intermediate to or lower than the two input flows. The ejector motive nozzle facilitates this mixing process by accelerating the high-pressure motive flow, thereby creating a high speed jet that is channeled through a mixing tube or chamber to entrain the low pressure suction flow. The two mixed flows are then discharged, typically through a diffuser.

Some known ejectors use a motive nozzle that is surrounded by a casing and includes a nozzle tip having a round or rectangular cross-section oriented about an axis of the ejector. At least some known nozzles may create a motive jet that oscillates in a bending mode, producing coherent flow disturbances such as partial ring vortex structures at an edge of the jet. When these coherent flow disturbances strike a downstream wall of the casing, reflected acoustic waves may be produced and feedback towards the nozzle. The feedback waves may reinforce the jet bending oscillations and result in a fluid dynamic resonance that may produce damaging structural loads and/or high noise levels within the ejector. Over time, fluctuating loads produced by this fluid dynamic resonance may decrease the lifespan of the ejector or other hardware, add to maintenance costs, and/or create objectionable levels of environmental noise.

BRIEF DESCRIPTION OF THE INVENTION

In one aspect, a method of assembling an ejector is provided, wherein the method includes providing a motive nozzle tip having a centerline axis and including a nozzle tip edge having at least one protrusion extending through a plane normal to the centerline axis. The method also includes coupling the motive nozzle tip to the ejector.

In another aspect, an ejector is provided, wherein the ejector includes a motive nozzle tip having a centerline axis and including a nozzle tip edge having at least one protrusion extending through a plane normal to the centerline axis.

In a further aspect, a gas turbine engine is provided, wherein the gas turbine engine includes a compressor and an ejector coupled in flow communication with and configured to receive air bled from the compressor. The ejector includes a motive nozzle tip having a centerline axis and including a nozzle tip edge having at least one protrusion extending through a plane normal to the centerline axis.

DETAILED DESCRIPTION OF THE INVENTION

Figure 1:
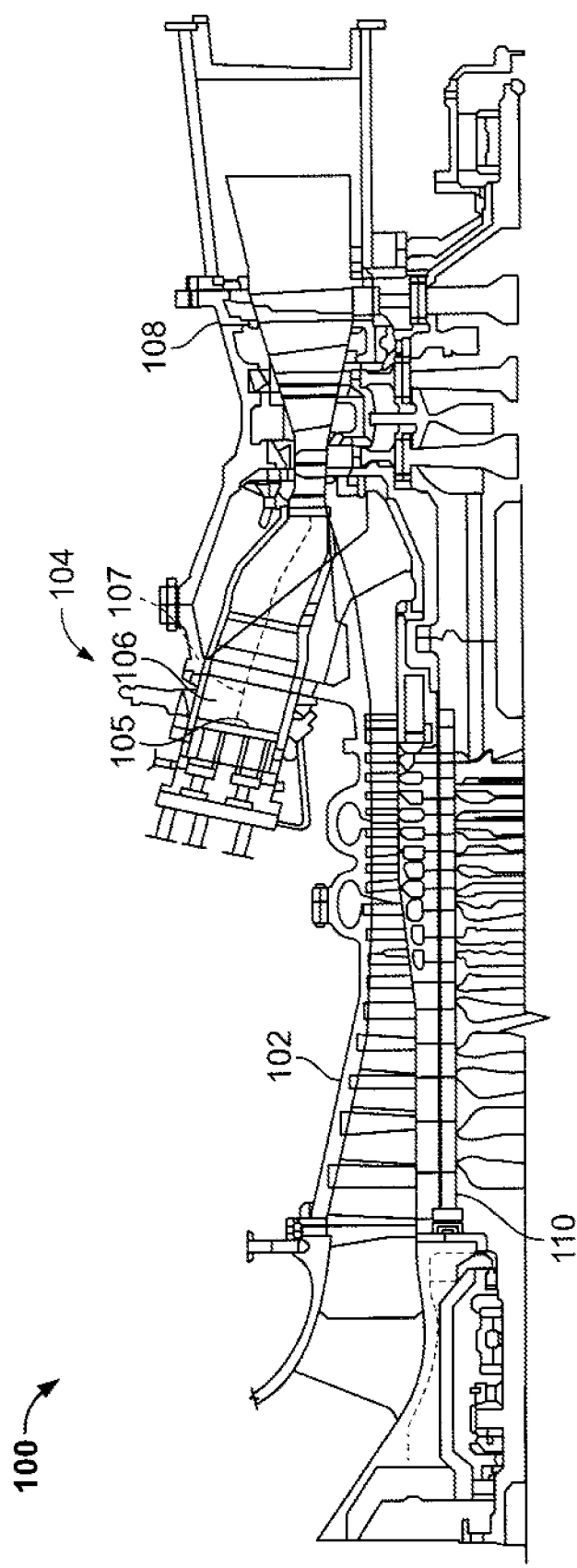
FIG. 1 is a cross-sectional schematic illustration of an exemplary gas turbine engine.

FIG. 1 is a schematic illustration of an exemplary gas turbine engine 100. Engine 100 includes a compressor 102 and a combustor assembly 104. Combustor assembly 104 includes a combustor assembly inner wall 105 that at least partially defines a combustion chamber 106. Combustion chamber 106 has a centerline 107 that extends therethrough. In the exemplary embodiment, engine 100 includes a plurality of combustor assemblies 104. Combustor assembly 104, and, more specifically, combustion chamber 106 is coupled downstream from and in flow communication with compressor 102. Engine 100 also includes a turbine 108 and a compressor/turbine shaft 110 (sometimes referred to as rotor 110). In the exemplary embodiment, combustion chamber 106 is substantially cylindrical and is coupled in flow communication with turbine 108. Turbine 108 is rotatably coupled to, and drives, rotor 110. Compressor 102 is also rotatably coupled to shaft 110. The present invention is not limited to any one particular engine and may be implanted in connection with other engines or other devices which employ ejectors in any part of the processes by which they operate. For example, the present invention may be used with, but is not limited to use with oil refinery devices, chemical plant devices, and electric cars.

In operation, air flows through compressor 102 and a substantial amount of compressed air is supplied to combustor assembly 104. Assembly 104 is also in flow communication with a fuel source (not shown in FIG. 1) and channels fuel and air to combustion chamber 106. In the exemplary embodiment, combustor assembly 104 ignites and combusts fuel, for example, synthetic gas (syngas) within combustion chamber 106 that generates a high temperature combustion gas stream (not shown in FIG. 1). Alternatively, assembly 104 combusts fuels that include, but are not limited to natural gas and/or fuel oil. Combustor assembly 104 channels the combustion gas stream to turbine 108 wherein gas stream thermal energy is converted to mechanical rotational energy.

Figure 2:
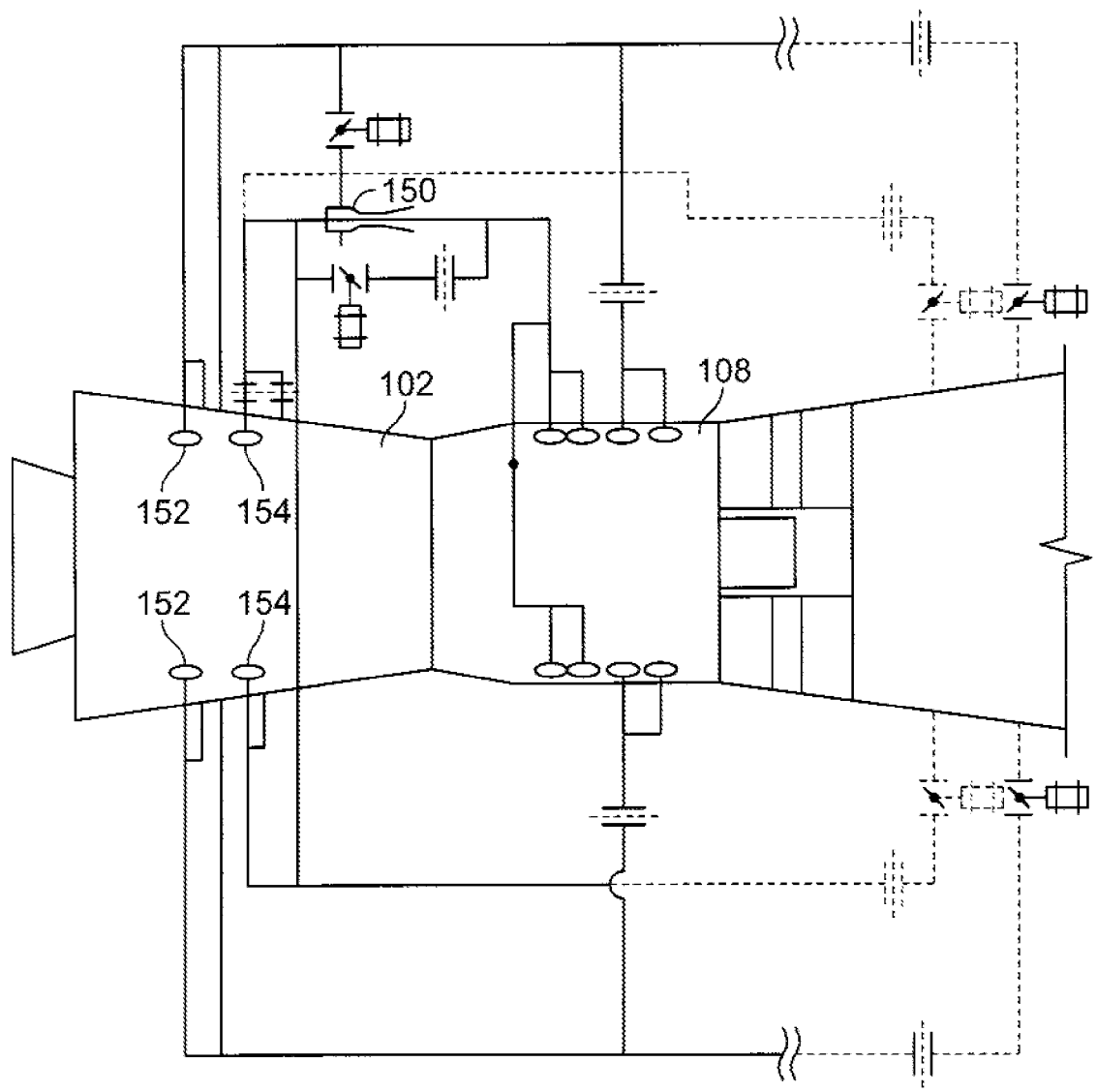
FIG. 2 is a schematic block diagram of the engine shown in FIG. 1 and including a turbine cooling ejector.

FIG. 2 is a schematic block diagram of engine 100 including a turbine cooling ejector 150 coupled in flow communication between compressor 102 and turbine 108. Low-pressure air is extracted from compressor 102 from a plurality of outlets 152 and high-pressure air is extracted from a plurality of outlets 154. In the exemplary embodiment, low-pressure air is extracted from the ninth stage of compressor 102 and high-pressure air is extracted from the thirteenth stage of compressor 102. In alternative embodiments, low-pressure air may be extracted at any compressor low-pressure stage and high-pressure air may be extracted from any compressor high-pressure stage.

The high-pressure and low-pressure air is channeled to ejector 150. Specifically, high-pressure air is channeled axially through a motive nozzle (not shown) within ejector 150, and low-pressure air is channeled to a chamber (not shown) surrounding the motive nozzle. As high-pressure air is discharged from the motive nozzle, it entrains the low-pressure air, to facilitate mixing between the two air flows. The mixed air flow is discharged to turbine 108 wherein the air facilitates cooling turbine 108. As such, ejector 150 facilitates cooling turbine 108 using low-pressure air, such that the efficiency of engine 100 is improved as compared to systems using high-pressure cooling air.

Figure 3:
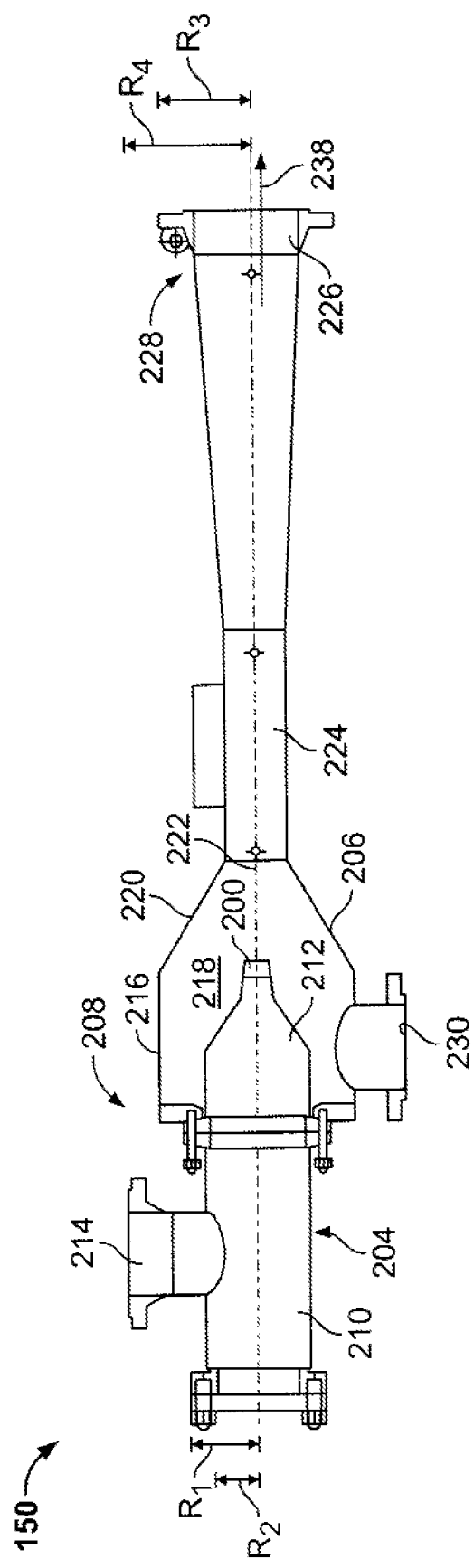
FIG. 3 is an enlarged schematic illustration of the turbine cooling ejector shown in FIG. 2.
Figure 4:
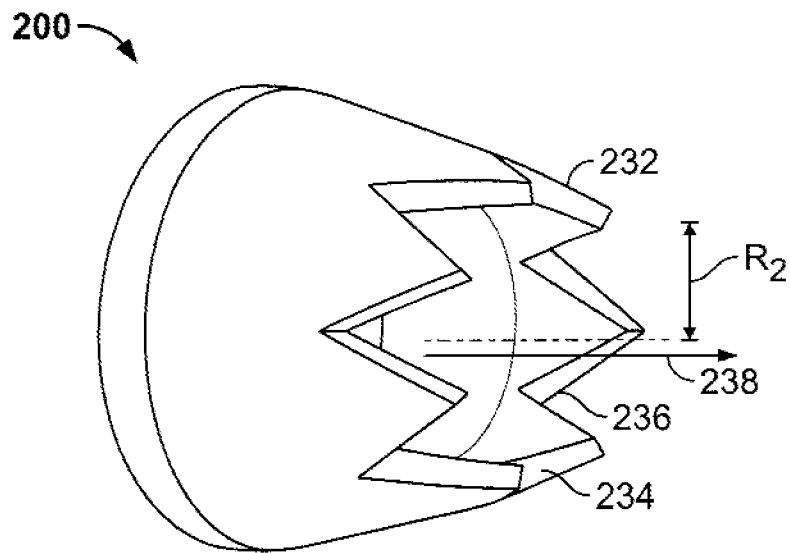
FIG. 4 is a perspective view of an exemplary nozzle tip that may be used with the turbine cooling ejector shown in FIG. 3.
Figure 5:
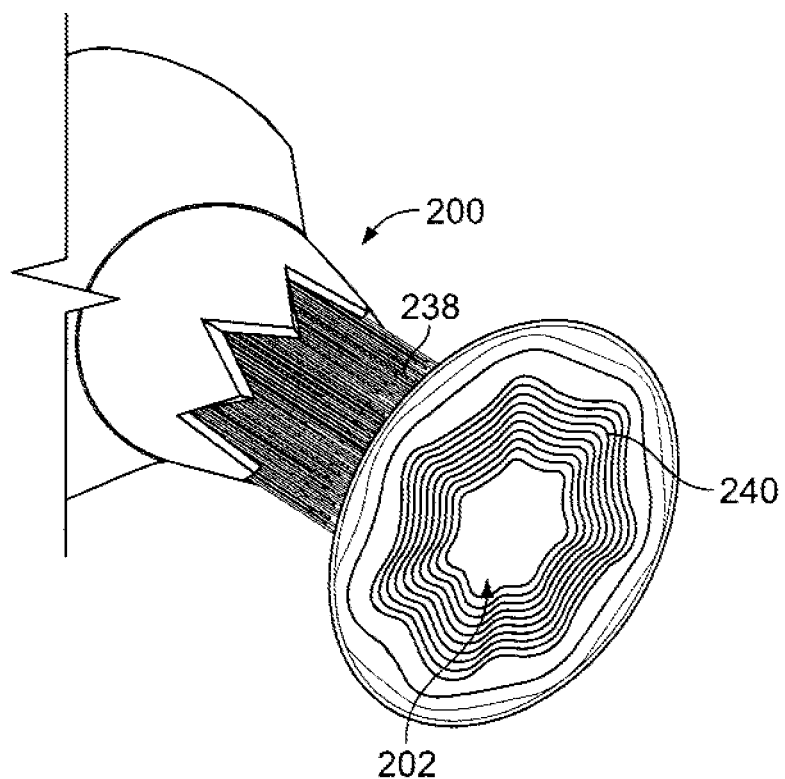
FIG. 5 is a perspective view of an exemplary cooling jet stream discharged from the nozzle tip shown in FIG. 4.

FIG. 3 is an enlarged schematic illustration of ejector 150. FIG. 4 is a perspective view of an exemplary motive nozzle tip 200 that may be used with ejector 150. FIG. 5 is a perspective view of an exemplary cooling jet 202 discharged from nozzle tip 200. Ejector 150 includes a motive nozzle 204 and a casing 206 that extends radially outward from a downstream end 208 of motive nozzle 204. Motive nozzle 204 includes a substantially annular body portion 210 and a tapered conical portion 212 extending from downstream end 208. Nozzle tip 200 extends from downstream end 208 with a frusto-conical cross-sectional shape, such that motive nozzle body portion 210 has a larger radius $R_1$ than a radius $R_2$ of nozzle tip 200. Body portion 210 also includes a high-pressure inlet 214.

Casing 206 includes a substantially annular body portion 216 that is spaced radially outward from motive nozzle downstream end 208, such that a low-pressure chamber 218 is defined therebetween. A frusto-conical portion 220 extends downstream from casing body portion 216. Portion 220 is positioned such that low-pressure chamber 218 is coupled in flow communication with a chamber 222 defined by conical portion 220. Furthermore, a substantially annular mixing channel 224 is coupled in flow communication with, and downstream from, conical portion 220. Mixing channel 224 has a radius $R_3$ that is smaller than a radius $R_4$ of casing body portion 216. An ejection end 226 of ejector 150 is defined at a downstream end 228 of casing 206. Furthermore, casing body 216 includes a low-pressure inlet 230.

Figure 6:
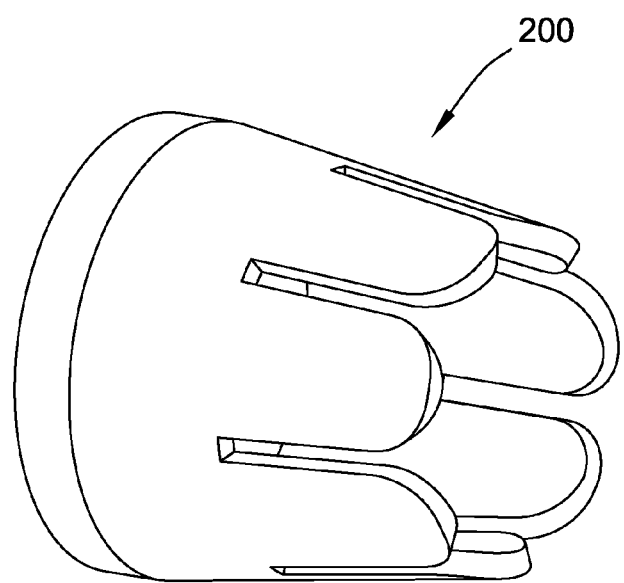
FIG. 6 is a perspective view of an alternative nozzle tip.

The cross sectional area of nozzle tip 200 is convergent in the direction of flow and, in the exemplary embodiment, includes a plurality of protrusions 232 that extend substantially axially therefrom to define a nozzle lip 234. In the exemplary embodiment, protrusions 232 are identical and each has a substantially triangular shape. Protrusions 232 extend circumferentially about nozzle tip 200, such that a plurality of triangular recesses 236 are defined between each pair of circumferentially-adjacent protrusions 232. Specifically, protrusions 232 define a chevron-shaped nozzle lip 234 at an end of nozzle tip 200. In an alternative embodiment shown in FIG. 6, nozzle tip 200 is slotted and includes a plurality of protrusions extending from a nozzle lip defined at an edge of the slotted nozzle tip. Protrusions 232 may be rounded such that nozzle tip 200 includes a plurality of round-edged cutouts. Moreover, although only seven protrusions 232 are illustrated, it should be noted that nozzle tip 200 may include more or less protrusions 232. In addition, the size, shape, number, and relative orientation of protrusions 232 is variably selected depending on the use of nozzle tip 200 to facilitate optimizing jet flow 238 discharged therefrom. More specifically, protrusions 232 and, more particularly, nozzle lip 234 facilitate creating a jet flow discharged therefrom with lobed-shaped vortices 240, for example, a lobed-shaped jet 202.

During operation, high-pressure air is channeled to ejector 150 and is discharged through inlet 214 into motive nozzle 204. Air at relatively low pressure is discharged through low pressure inlet 230 into low pressure chamber 218. The high-pressure air flows substantially axially through motive nozzle 204 and is accelerated to high speed prior to being discharged through nozzle tip 200. The orientation of protrusions 232 facilitates discharged air from nozzle tip 200 creating lobed-shaped jet 202. The shape, velocity, and pressure of lobed-shaped jet 202 facilitates jet 202 entraining the low-pressure air in low-pressure chamber 218 causing the high-pressure and low-pressure air to mix in mixing channel 224. The mixed air is then discharged through ejector end 226, such that the mixture of high-pressure and low-pressure air is utilized to facilitate cooling turbine 108. In alternative embodiments, the mixed air may be used to cool other components of engine 100.

The nozzle tip is configured to facilitate the formation of longitudinal flow structures (such as lobes or counter-rotating vortices) that stabilize the jet. Furthermore, the nozzle tip is configured to resist formation of other destabilizing flow structures (such as ring vortices) when the jet is perturbed by noise or other flow disturbances. Specifically, during engine operations, the lobed-shaped jet 202 created by protrusions 232 facilitates increasing the life-span of ejector 150. Specifically, the protrusions 232 facilitate reducing the intensity and symmetry of flow disturbances produced by or associated with jet bending oscillations, such as coherent ring vortices. Typically, jet bending oscillations in an ejector cause acoustic waves to reflect off a casing wall and back towards the motive nozzle. The lobes created in jet 202 by protrusions 232 reduce the coherency of circumferential turbulent flow structure produced by jet bending, interfering with reinforcement of such flow structures by acoustic waves reflected from casing 206. Furthermore, because the nozzle interior trailing edges produced by protrusions 232 lie outside of a plane normal to the nozzle, the ability of reflected acoustic waves to excite further jet bending oscillation is reduced. Specifically, protrusions 232 facilitate preventing a reflected wave from oscillating in phase with oscillations of jet 202, such that the oscillations are disrupted and not enhanced. As such, protrusions 232 facilitate disrupting both the formation and excitation of jet bending oscillations, and thereby, facilitate reducing the effects that jet bending oscillations may have on ejector 150.

As a result of protrusions 232, less vibration is induced to ejector 150 by jet bending oscillations as flow is discharged from nozzle tip 200. Furthermore, nozzle tip 200 and, more particularly, protrusions 232, facilitate reducing the excitation of any resonance and vibrations induced to ejector 150. Accordingly, ejector 150 generates substantially less noise, and experiences substantially reduced fluctuating structural loads than other known ejectors. As such, a useful life of ejector 150 and other connected devices is facilitated to be enhanced, and environmental noise produced by the ejector is reduced.

The above-described methods and apparatus facilitate increasing the life span of an ejector and reducing environmental noise produced by its operation. Specifically, the chevron-shaped nozzle tip produces a lobed-shape jet that facilitates reducing jet bending oscillations which may occur in an ejector motive nozzle. Furthermore, the lobed-shaped jet facilitates reducing the excitation of jet bending oscillations, such that vibrations induced to the ejector motive nozzle are reduced. Subsequently, less noise and fewer structural loads are generated within the ejector. Moreover, the chevron-shaped nozzle tip also increases entrainment of the low-pressure air, allowing the ejector to operate more efficiently. Ultimately, the above-described methods and apparatus facilitate providing a more efficient and more stable ejector, such that system engine efficiency may increase, costs associated with maintenance of the ejector and devices in flow communication with the ejector may decrease, and the life-span of the system may increase.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Although the apparatus and methods described herein are described in the context of an ejector motive nozzle for a gas turbine engine, it is understood that the apparatus and methods are not limited to ejector motive nozzles or gas turbine engines. Likewise, the ejector motive nozzle components illustrated are not limited to the specific embodiments described herein, but rather, components of the ejector motive nozzle can be utilized independently and separately from other components described herein.

While the invention has been described in terms of various specific embodiments, those skilled in the art will recognize that the invention can be practiced with modification within the spirit and scope of the claims.

What is claimed is:

1. A method of assembling an ejector, said method comprising: providing a motive nozzle tip having a centerline axis and including a slotted nozzle tip edge having at least one protrusion extending through a plane substantially normal to the centerline axis, the motive nozzle tip includes a frusto-conical portion that is downstream from a tapered conical portion, and wherein the frusto-conical portion tapers at a first angle with respect to the centerline axis and the tapered conical portion tapers at a second angle with respect to the centerline axis, wherein the first angle is different than the second angle; and configuring the motive nozzle tip to produce lobed-shaped vortices in a stream discharged therefrom; and coupling the motive nozzle tip to the ejector, such that the motive nozzle tip is positioned within an ejector casing that includes a low-pressure chamber and an annular mixing channel defined therein, wherein the annular mixing channel is downstream from the low-pressure chamber.

2. A method in accordance with claim 1 wherein coupling the motive nozzle tip to the ejector comprises coupling the motive nozzle tip to the ejector such that at least one rounded protrusion extends outward from the slotted nozzle tip edge.

3. A method in accordance with claim 1 further comprising configuring the motive nozzle tip to facilitate reducing jet bending oscillations in a stream discharged therefrom.

4. A method in accordance with claim 1 further comprising configuring the motive nozzle tip to facilitate preventing a feedback wave from exciting coherent flow structures within a jet discharged from the motive nozzle tip.

5. An ejector comprising a motive nozzle tip having a centerline axis and comprising: a frusto-conical portion downstream from a tapered conical portion, said frusto-conical portion tapers at a first angle with respect to the centerline axis and said tapered conical portion tapers at a second angle with respect to the centerline axis, wherein said first angle is different than said second angle; and a slotted nozzle tip edge comprising at least one protrusion extending through a plane substantially normal to the centerline axis, said motive nozzle tip is positioned within an ejector casing that includes a low-pressure chamber and an annular mixing channel defined therein, and is configured to produce lobed-shaped vortices in a jet discharged therefrom, wherein the annular mixing channel is downstream from the low-pressure chamber.

6. An ejector in accordance with claim 5 wherein said slotted nozzle tip edge further comprises at least one rounded protrusion extending outward therefrom.

7. An ejector in accordance with claim 5 wherein said motive nozzle tip is configured to facilitate reducing jet bending oscillations in a jet discharged therefrom.

8. An ejector in accordance with claim 5 wherein said motive nozzle tip is configured to facilitate preventing a feedback wave from exciting jet bending oscillations within a jet discharged from said motive nozzle tip.

9. A gas turbine engine comprising: a compressor; and an ejector coupled in flow communication with said compressor and configured to receive air bled therefrom, said ejector comprising: a casing that includes a low-pressure chamber and an annular mixing channel; and a motive nozzle tip having a centerline axis and comprising a frusto-conical portion that is downstream from a tapered conical portion, said frutso-conical portion tapers at a first angle with respect to the centerline axis, said tapered conical portion tapers at a second angle with respect to the centerline axis, wherein said first angle is different than said second angle, said motive nozzle tip further comprising a slotted nozzle tip edge having at least one protrusion extending through a place substantially normal to the centerline axis, said nozzle tip positioned within said casing and upstream from said annular mixing channel, wherein said motive nozzle tip is configured to produce lobed-shaped vortices in a jet discharged therefrom.

10. A gas turbine engine in accordance with claim 9 wherein said motive nozzle tip is configured to facilitate reducing jet bending oscillations in a jet discharged therefrom.

11. A gas turbine engine in accordance with claim 9 wherein said motive nozzle tip is configured to facilitate preventing a feedback wave from exciting jet bending oscillations within a jet discharged from said motive nozzle tip.

* * * * *